Patented Nov. 14, 1939

2,179,987

UNITED STATES PATENT OFFICE 2,179,987

PREPARATION OF 1-HYDROXY-BENZOTHIAZOLE

Edward M. Van Duzee, deceased, late of Midland, Mich., by Clarence H. Macomber, administrator, Midland, Mich., assignor to The Dow Chemical Company, Midland, Mich., a corporation of Michigan No Drawing. Application July 2, 1937,
Serial No. 151,724

6 Claims. (Cl. 260—304)

This invention concerns a new method for making 1-hydroxybenzothiazole.

It has been discovered that 1-mercaptobenzothiazole may be hydrolyzed to produce 1-hydroxybenzothiazole, but that such hydrolysis occurs satisfactorily only when carried out at a moderate temperature in the presence of an oxidizing agent.

According to the invention, 1-mercaptobenzothiazole is reacted with an aqueous solution of an alkali in the presence of an oxidizing agent at room temperature, i. e., 20°–25° C. or below, and preferably at temperatures between −10° and +10° C. As the alkaline agent sodium or potassium hydroxide is ordinarily employed, although other alkalies, such as sodium carbonate, potassium carbonate, lime, etc., may be used. As the oxidizing agent any of those commonly employed for carrying out chemical oxidations, e. g., sodium hypochlorite, bleaching powder, hydrogen peroxide, gaseous chlorine, etc., may be employed, but it is preferable to use a solution of an alkali or alkaline earth metal hypohalite, since a hypohalite is particlarly well adapted to use in the reaction.

The proportions of 1-mercaptobenzothiazole, alkali, oxidizing agent and water may be varied widely, but the yield of 1-hydroxybenzothiazole is usually highest when from 3 to 6 mols of alkali and from 1.5 to 3 chemical equivalents of oxidizing agent are employed per mol of 1-mercaptobenzothiazole. Approximately 24 parts by weight of water is usually employed per part of alkali, but the water may be employed in smaller or greater proportion.

The reactants may be mixed in any desired order, but the reaction is carried out preferably by dissolving the 1-mercaptobenzothiazole in the aqueous alkali and thereafter adding the oxidizing agent gradually with stirring while maintaining the mixture at a temperature between −10° and +10° C. When all of the oxidizing agent has been added, stirring is continued for a short time, e. g., 0.5 hour, to insure completion of the reaction, after which the solution is filtered and evaporated until crystals start to separate. The mixture is then cooled to complete the crystallization and the product is separated by filtration or decantation.

The following examples will illustrate various ways of performing the method:

Example 1

50 grams (0.299 mol) of 1-mercaptobenzothiazole was dissolved in a dilute (4 per cent) aqueous sodium hydroxide solution at about 80° C. The resultant solution was filtered to remove a trace of insoluble matter and cooled in a salt-ice bath to approximately 0° C. 1185 cubic centimeters (3.3 mols) of a 5 per cent NaOCl solution was added gradually over a period of about 70 minutes, while maintaining the mixture at a temperature between −5° and 0° C. After completion of the reaction, the solution was filtered and the filtrate evaporated until crystals started to separate. The mixture was then cooled to about room temperature to complete the crystallization, the crystalline product being filtered from the mother liquor and dried. There was obtained 34 grams of 1-hydroxybenzothiazole melting at approximately 137–139° C. The yield was approximately 75 per cent of theoretical.

Example 2

1 gram mol of 1-mercaptobenzothiazole was dissolved in 6 kilograms of a 4 per cent aqueous sodium hydroxide solution. The solution was filtered and cooled to about −3° C., after which 3 gram mols of gaseous chlorine was led into the reaction mixture, the first two mols being added over a period of thirty-six minutes and the remainder over a period of thirty minutes. During the introduction of chlorine the mixture was stirred continuously and maintained at a temperature between −3° and 1° C. The product was then separated as in Example 1, whereby 1-hydroxybenzothiazole was obtained in 46 per cent of the theoretical yield.

Other modes of applying the principle of the invention may be employed instead of those explained, change being made as regards the method herein disclosed, provided the step or steps stated by any of the following claims or the equivalent of such stated step or steps be employed.

It is therefore particularly pointed out and distinctly claimed as the invention:

1. The process for making 1-hydroxybenzothiazole which comprises hydrolyzing 1-mercaptobenzothiazole with an aqueous alkali in the presence of an oxidizing agent at a temperature below approximately 25° C., and thereafter separating 1-hydroxybenzothiazole directly from the reaction mixture without acidification thereof.

2. The process for making 1-hydroxybenzothiazole which comprises hydrolyzing 1-mercaptobenzothiazole with an aqueous alkali in the presence of an oxidizing agent at a temperature between about −10° C. and about 10° C., and thereafter separating 1-hydroxybenzothiazole directly from the reaction mixture without acidification thereof.

3. In a process for the preparation of 1-hydroxybenzothiazole, the steps which consist in dissolving 1-mercaptobenzothiazole in an excess of a dilute aqueous alkali, gradually adding an oxidizing agent while maintaining the reaction temperature between about −10° C. and about 10° C., and thereafter separating 1-hydroxybenzothiazole directly from the reaction mixture without acidification thereof.

4. In a process for the preparation of 1-hydroxybenzothiazole, the steps which consist in dissolving 1-mercaptobenzothiazole in from 3 to 6 molecular equivalents of a dilute aqueous alkali metal hydroxide, gradually adding from 1.5 to 3 molecular equivalents of a dilute aqueous solution of an alkali metal hypohalite while maintaining the mixture at a temperature between about −10° C. and about 10° C., and thereafter separating 1-hydroxybenzothiazole directly from the reaction mixture without acidification thereof.

5. In a process for the preparation of 1-hydroxybenzothiazole, the steps which consist in dissolving 1-mercaptobenzothiazole in from 3 to 6 molecular equivalents of a dilute aqueous alkali metal hydroxide, gradually adding from 1.5 to 3 molecular equivalents of a dilute aqueous solution of sodium hypochlorite while maintaining the mixture at a temperature between about −10° C., and about 10° C., and thereafter separating 1-hydroxybenzothiazole directly from the reaction mixture without acidification thereof.

6. In a process for the preparatilon of 1-hydroxybenzothiazole, the steps which consist in dissolving 1-mercaptobenzothiazole in from 3 to 6 molecular equivalents of a dilute aqueous alkali metal hydroxide, gradually adding from 1.5 to 3 molecular equivalents of gaseous chlorine while maintaining the mixture at a temperature between about −10° C., and about 10° C., and thereafter separating 1-hydroxybenzothiazole directly from the reaction mixture without acidification thereof.

CLARENCE H. MACOMBER,
*Administrator of the Estate of Edward M. Van Duzee, deceased.*